US012093427B2

(12) United States Patent
Barber et al.

(10) Patent No.: US 12,093,427 B2
(45) Date of Patent: Sep. 17, 2024

(54) METHODS AND SYSTEMS FOR PROCESSING AGENCY-INITIATED PRIVACY REQUESTS

(71) Applicant: DataGrail, Inc., San Francisco, CA (US)

(72) Inventors: Daniel Barber, San Francisco, CA (US); Earl Hathaway, Pacifica, CA (US); Ignacio Zendejas, San Jose, CA (US)

(73) Assignee: DataGrail, Inc., San Francisco, CA (US)

( * ) Notice: Subject to any disclaimer, the term of this patent is extended or adjusted under 35 U.S.C. 154(b) by 103 days.

(21) Appl. No.: 16/949,411

(22) Filed: Oct. 28, 2020

(65) Prior Publication Data

US 2022/0129586 A1    Apr. 28, 2022

(51) Int. Cl.
*G06F 21/62* (2013.01)
*G06F 21/31* (2013.01)

(52) U.S. Cl.
CPC .......... *G06F 21/6263* (2013.01); *G06F 21/31* (2013.01); *G06F 21/6254* (2013.01); *G06F 2221/2141* (2013.01)

(58) Field of Classification Search
CPC .. G06F 21/6263; G06F 21/31; G06F 21/6254; G06F 2221/2141
See application file for complete search history.

(56) References Cited

U.S. PATENT DOCUMENTS

| | | | |
|---|---|---|---|
| 8,595,499 B2 | 11/2013 | Haider et al. | |
| 9,185,086 B1* | 11/2015 | Talati | H04L 63/04 |
| 9,483,535 B1* | 11/2016 | Coyle | G06F 16/248 |
| 10,184,882 B2 | 1/2019 | Humphrey et al. | |
| 11,157,652 B2 | 10/2021 | Basava et al. | |
| 11,526,627 B2 | 12/2022 | Barber et al. | |
| 11,829,507 B2 | 11/2023 | Barber et al. | |
| 11,841,979 B2 | 12/2023 | Barber et al. | |
| 2012/0259782 A1* | 10/2012 | Hammad | G06Q 20/3674 705/44 |

(Continued)

OTHER PUBLICATIONS

International Preliminary Report on Patentability dated Nov. 3, 2022, in PCT Application No. PCT/US2021/028561.

(Continued)

*Primary Examiner* — Shin-Hon (Eric) Chen
*Assistant Examiner* — Thomas A Carnes
(74) *Attorney, Agent, or Firm* — Weaver Austin Villeneuve & Sampson LLP

(57) ABSTRACT

Systems and methods for processing privacy requests related to information privacy are described. A server computing system may be configured to receive data related to a privacy request for personal information associated with a person, the data related to the privacy request sent by an agent of the person to a company from a computer system associated with the agent, the agent acting on behalf of the person as related to the information privacy, the personal information stored in one or more databases associated with the server computing system; confirm that the person authorizes the agent to act on behalf of the person as related to the information privacy; and based on successful confirmation that the person authorizes the agent, process the privacy request on behalf of the company.

20 Claims, 10 Drawing Sheets

(56) References Cited

U.S. PATENT DOCUMENTS

| | | | |
|---|---|---|---|
| 2015/0095968 A1* | 4/2015 | Steiner | G06F 21/62 726/1 |
| 2017/0111364 A1* | 4/2017 | Rawat | G06F 21/316 |
| 2017/0193249 A1 | 7/2017 | Luria | |
| 2017/0287035 A1 | 10/2017 | Barday | |
| 2017/0287036 A1 | 10/2017 | Barday | |
| 2017/0324586 A1* | 11/2017 | Kim | H04L 51/06 |
| 2018/0159900 A1 | 6/2018 | Barday | |
| 2018/0183803 A1* | 6/2018 | Singh | G06Q 10/109 |
| 2018/0302392 A1 | 10/2018 | Gordon et al. | |
| 2018/0373890 A1* | 12/2018 | Barday | G06F 15/76 |
| 2019/0286839 A1 | 9/2019 | Mutha et al. | |
| 2019/0318122 A1* | 10/2019 | Hockey | G06Q 40/12 |
| 2019/0340613 A1 | 11/2019 | Ghosh et al. | |
| 2019/0392173 A1 | 12/2019 | Brannon et al. | |
| 2019/0392176 A1 | 12/2019 | Taron et al. | |
| 2019/0392177 A1 | 12/2019 | Brannon et al. | |
| 2020/0050792 A1* | 2/2020 | Barday | G06F 21/31 |
| 2020/0057864 A1 | 2/2020 | Parthasarathy | |
| 2020/0167501 A1 | 5/2020 | Brannon et al. | |
| 2020/0204545 A1 | 6/2020 | Pacella et al. | |
| 2020/0233977 A1 | 7/2020 | Chickerur et al. | |
| 2020/0267283 A1* | 8/2020 | Tong | G06V 30/412 |
| 2020/0387637 A1 | 12/2020 | Koren et al. | |
| 2021/0141929 A1 | 5/2021 | Hydro et al. | |
| 2021/0204116 A1* | 7/2021 | Naujok | G06F 21/31 |
| 2021/0334401 A1 | 10/2021 | Barber et al. | |
| 2021/0334407 A1 | 10/2021 | North et al. | |
| 2022/0027512 A1 | 1/2022 | Barber et al. | |
| 2022/0067130 A1* | 3/2022 | Dabbs | G06F 9/547 |
| 2023/0153463 A1 | 5/2023 | Barber et al. | |
| 2023/0206363 A1* | 6/2023 | Spaling | G06Q 50/18 705/311 |

OTHER PUBLICATIONS

International Search Report and Written Opinion dated Jul. 7, 2021 issued in Application No. PCT/US2021/028561.

International Search Report and Written Opinion dated Oct. 18, 2021, in application No. PCT/US2021/043188.

Notice of Allowance dated Nov. 26, 2021 issued in U.S. Appl. No. 16/947,289.

U.S. Notice of Allowance dated Aug. 3, 2022 in U.S. Appl. No. 16/947,289.

U.S. Non-Final office Action dated Apr. 27, 2022 in U.S. Appl. No. 16/947,289.

U.S. Non-Final Office Action dated Mar. 29, 2022, in U.S. Appl. No. 16/855,476.

U.S. Notice of Allowance dated Oct. 27, 2022 in U.S. Appl. No. 16/855,476.

U.S. Notice of Allowance dated Jan. 24, 2022 in U.S. Appl. No. 16/947,289.

U.S. Notice of Allowance dated Jul. 27, 2022 in U.S. Appl. No. 16/855,476.

U.S. Notice of Allowance dated Oct. 13, 2022 in U.S. Appl. No. 16/947,289.

U.S. Appl. No. 18/050,184, inventors Barber et al., filed Oct. 27, 2022.

International Preliminary Report on Patentability dated Feb. 9, 2023, in PCT Application No. PCT/US2021/043188.

U.S. Non-Final Office Action dated Dec. 15, 2022, in U.S. Appl. No. 16/855,476.

U.S. Final Office Action dated May 26, 2023 in U.S. Appl. No. 16/855,476.

U.S. Notice of Allowance dated Aug. 4, 2023, in U.S. Appl. No. 18/050,184.

U.S. Notice of Allowance dated Sep. 18, 2023, in U.S. Appl. No. 16/855,476.

* cited by examiner

METHODS AND SYSTEMS FOR PROCESSING AGENCY-INITIATED PRIVACY REQUESTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to processing privacy requests related to information privacy.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

In general, information privacy relates to the privacy of personal information and may be associated with the collection, storing, use, and sharing of the personal information. The personal information may be collected with or without knowledge of the subjects and may include information that is not publicly available. There are privacy laws that provide the subjects of the personal information the rights to request for the information, to have their information removed, to control the sale of their data, and to prohibit the disclosure or misuse of the personal information, among other rights. Companies that collect information from their customers and prospective customers therefore are required to provide the information when requested. For example, in California, the privacy law requires that websites that collect user data to disclose the type of information being collected, the types of third parties they might provide that information to, among others. It can be difficult for a company to comply with the request for information when the company may not even know what information it has collected.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

DETAILED DESCRIPTION

Figure 1:
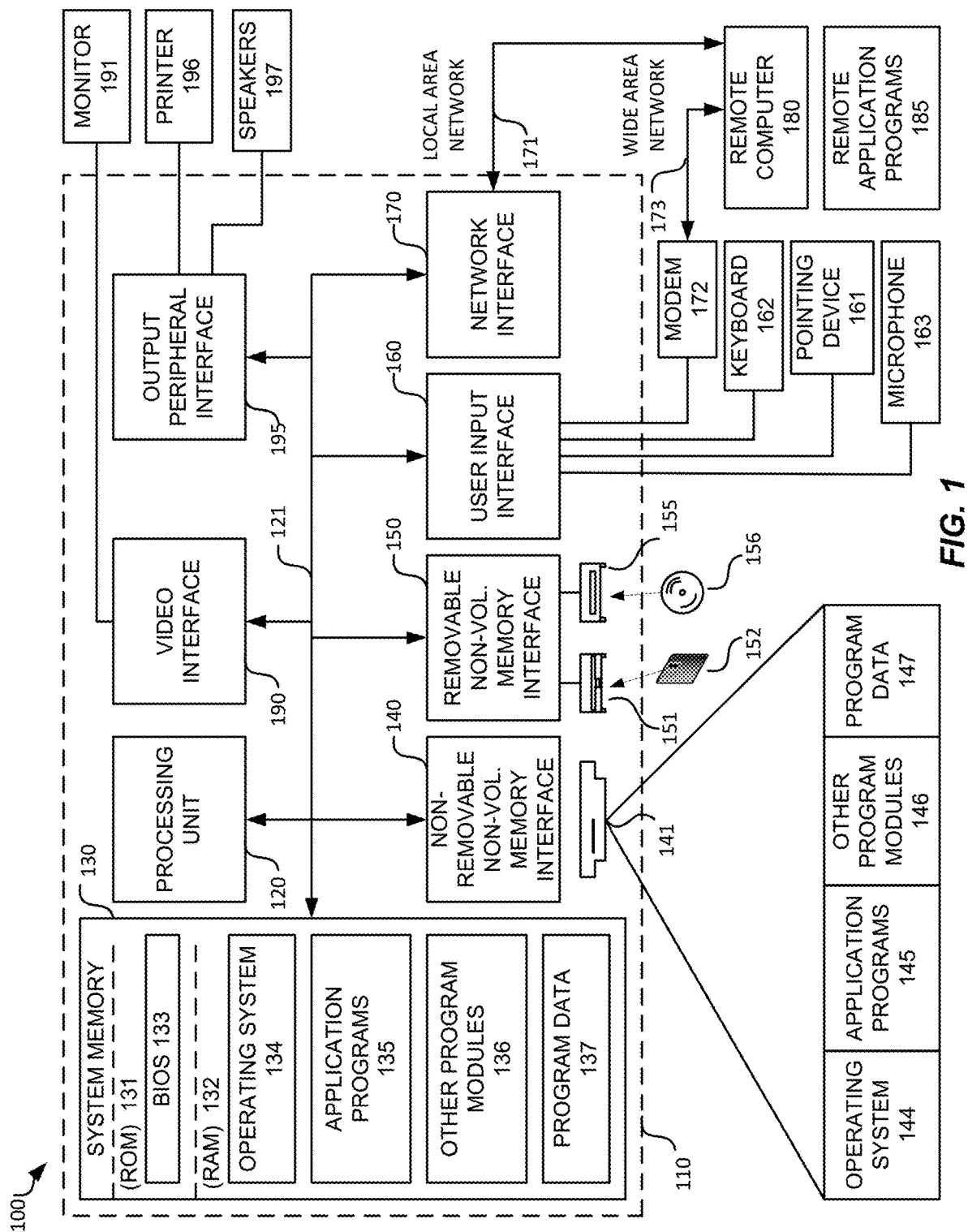
FIG. 1 shows a diagram of an example computing system that may be used with some implementations.

Examples of systems and methods associated with processing privacy requests received from a person or an agent of a person as related to information privacy will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed implementations may include a computer-implemented method for processing privacy requests as related to information privacy and may include receiving, by a server computing system, a privacy request related to personal information associated with a person, the privacy request sent by an agent of the person to a company from a computer system associated with the agent, the agent representing the person as related to the information privacy, the personal information stored in one or more databases associated with the server computing system; confirming, by the server computing system, that the person authorizes the agent to represent the person as related to the information privacy; and based on successful confirmation that the person authorizes the agent, processing, by the server computing system, the privacy request on behalf of the company.

The disclosed implementations may include a system for processing privacy requests and may include one or more processors, and a non-transitory computer readable medium storing a plurality of instructions, which when executed, cause the one or more processors of a server computing system to receive a privacy request related to personal information associated with a person, the privacy request sent by an agent of the person to a company from a computer system associated with an agent, the agent representing the person as related to information privacy, the personal information stored in one or more databases associated with the server computing system; confirm that the person authorizes the agent to represent the person as related to the information privacy; and based on successful confirmation that the person authorizes the agent, process the privacy request on behalf of the company.

The disclosed implementations may include a computer program product comprising computer-readable program code to be executed by one or more processors of a server computing system when retrieved from a non-transitory computer-readable medium, the program code including instructions to receive a privacy request related to personal information associated with a person, the privacy request sent by an agent of the person to a company from a computer system associated with an agent, the agent representing the person as related to information privacy, the personal information stored in one or more databases associated with the server computing system; confirm that the person authorizes the agent to represent the person as related to the information privacy; and based on successful confirmation that the person authorizes the agent, process the privacy request on behalf of the company.

While one or more implementations and techniques are described with reference to processing privacy requests related to information privacy implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the claimed subject matter. Further, some implementations may include using Hardware Security Module (HSM), a physical computing device that safeguards and manages digital keys for strong authentication, including, for example, the keys used to encrypt secrets associated with the data elements stored in the data stores. It may be noted that the term "data store" may refer to source control systems, file storage, virtual file systems, non-relational databases (such as NoSQL), etc. The term "database" as used herein may refer to any organized collection of data.

Any of the above implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In general, personal information may include information about a person that is shared or collected with or without knowledge of the person. The personal information may also include information that is not collected from a person such as information that is received from a public register. In the following description, both the terms "person" and "consumer" may be used to refer to someone whose personal information is protected by privacy rights. Further, both the terms "agent" and "agency" may be used to refer to someone or a company that is authorized to act on behalf of the "person" or "consumer" with respect to the privacy rights.

It may be noted that the definition of personal information may vary depending on the governing agency. For example, the California Consumer Privacy Act ("CCPA") Section 1798.140(o)(1) defines personal information as information that identifies, relates to, describes, is reasonably capable of being associated with, or could reasonably be linked, directly or indirectly, with a particular consumer or household. The CCPA indicates that personal information may include identifiers such as a real name, alias, postal address, unique personal identifier, online identifier, internet protocol address, email address, account name, social security number, driver's license number, passport number, or other similar identifiers. Personal information may include biometric information, Internet or other electronic network activity information, including, but not limited to, browsing history, search history, and information regarding a consumer's interaction with an internet website, application, or advertisement, geolocation data, professional or employment-related information, and education information, among others. According to the EU's General Data Protection Regulation (GDPR) Article 4, "Personal data" means any information relating to an identified or identifiable natural person; an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person. Furthermore, the GDPR only applies to personal data processed in one of two ways: personal data processed wholly or partly by automated means (or, information in electronic form); and personal data processed in a non-automated manner which forms part of, or is intended to form part of, a 'filing system' (or, written records in a manual filing system).

Section 1798.100 (a) of the CCPA also indicates that a consumer shall have the right to request that a business that collects a consumer's personal information disclose to that consumer the categories and specific pieces of personal information the business has collected. In addition, Chapter 20 of the California Consumer Privacy Act Regulations, Proposed Text of Regulations submitted on Jun. 1, 2020 by the Office of the California Attorney General to the California Office of Administrative Law (OAL), California residents may designate an authorized agent to submit a request to delete personal information or a request to know about personal information collected by a business. An authorized agent may be either a natural person or a business entity registered with the Secretary of State to conduct business in California. When a consumer uses an authorized agent to submit a request to know or a request to delete, a business may require that the consumer do the following: (1) provide the authorized agent signed permission to do so, (2) verify their own identity directly with the business, and (3) directly confirm with the business that they provided the authorized agent permission to submit the request. The CCPA indicates that a business may deny a request from an authorized agent that does not submit proof that they have been authorized by the consumer to act on their behalf. The CCPA also indicates that a business is required to provide instructions on how an authorized agent can make a request under the CCPA on the consumer's behalf.

The right for information privacy may create many challenges that need to be addressed by the businesses because non-compliance may result in civil actions or civil penalties. In addition, when a business is found to be non-compliant, correction action may need to be performed within a narrow period of time after being notified of the non-compliance. Furthermore, some businesses may use so many different databases and other systems that they have difficulty identifying what information they have collected and where the collected information is stored. As such, having a system to help responding to the consumers' requests and managing the collected personal information is beneficial for accurate and timely response.

FIG. 1 is a diagram of an example computing system that may be used with some implementations. In diagram 100, computing system 110 may be used by a user to establish a connection with a server computing system. The computing system 110 is only one example of a suitable computing system, such as a mobile computing system, and is not intended to suggest any limitation as to the scope of use or functionality of the design. Neither should the computing system 110 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 110 may be implemented as a mobile computing system such as one that is configured to run with an operating system (e.g., iOS) developed by Apple Inc. of Cupertino, California or an operating system (e.g., Android) that is developed by Google Inc. of Mountain View, California.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 110 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 110 typically includes a variety of computer program product. Computer program product can be any available media that can be accessed by computing system 110 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 110. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 110, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 110 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 110 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 110 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 110. The logical connections depicted in FIG. 1 include a local area network (LAN) 171 and a wide area network (WAN) 173 but may also include other networks. Such networking environments are commonplace in offices, enterprise-wide computer networks, intranets and the Internet.

FIG. 1 includes a local area network (LAN) 171 and a wide area network (WAN) 173 but may also include other networks. Such networking environments are commonplace in offices, enterprise-wide computer networks, intranets and the Internet.

When used in a LAN networking environment, the computing system 110 may be connected to the LAN 171 through a network interface or adapter 170. When used in a WAN networking environment, the computing system 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some implementations may be carried out on a computing system such as that described with respect to FIG. 1. However, some implementations may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
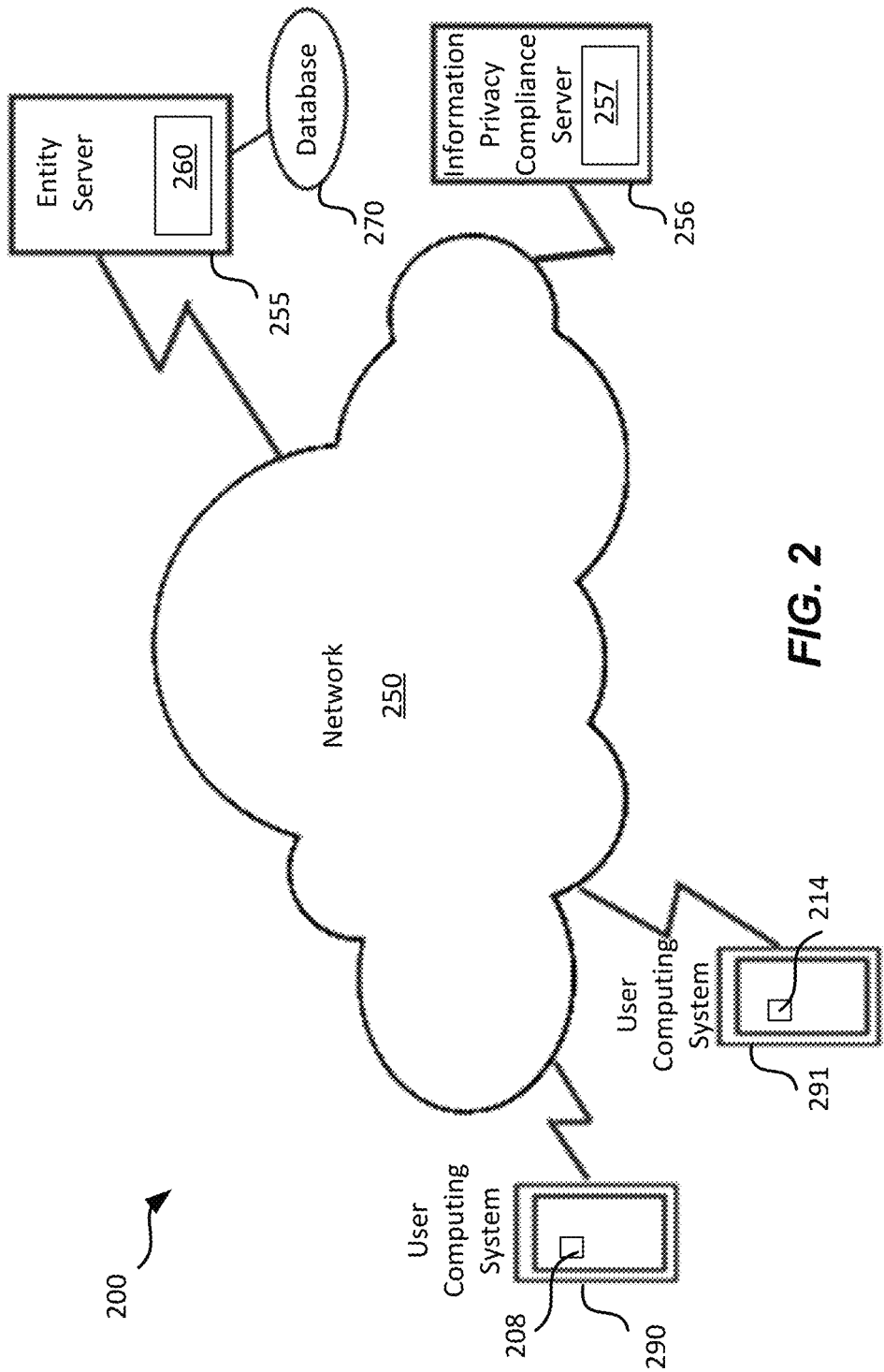
FIG. 2 shows a diagram of an example network environment that may be used with some implementations.

FIG. 2 shows a diagram of an example network environment that may be used with some implementations. Diagram 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 and 256 via the network 250.

The server computing system 255 (also referred to as an entity server) may be coupled with database 270 and may be associated with an entity. The entity may be an organization or a business that has legally collected and stored personal information from many consumers. For example, CCPA Section 1798.140(c)(1) defines a business as a sole proprietorship, partnership, limited liability company, corporation, association, or other legal entity that is organized or operated for the profit or financial benefit of its shareholders or other owners that collects consumers' personal information or on the behalf of which that information is collected and that alone, or jointly with others, determines the purposes and means of the processing of consumers' personal information, that does business in the State of California within certain thresholds.

Each of the computing systems 290 and 291 may include an application module such as module 208 or 214. For example, a user may use the computing system 290 and the application module 208 (e.g., browser application) to login to a web application 260 hosted by the entity server 255. The user may engage in transactions with the web application 260 and may provide consent to enable personal information of the user to be collected by the web application 260. The personal information may be stored in the database 270. For example, a transaction may be a registration operation such as when the user registers with the web application 260, or the transaction may involve purchase and payment operations such as when the user places an item into an online shopping cart and checks out by paying with a credit card.

The server computing system 256 (also referred to as information privacy compliance server) may be coupled with the entity server 255 and may include information privacy compliance application 257. The information compliance application 257 may be configured to operate on behalf of an entity (or a company) associated with the entity server 255 to enable the entity to stay in compliance with privacy laws. One of the computing systems 290 and 291 may be used to initiate a request for personal information to the entity server 255. A request for personal information may be referred to as a privacy request for personal information. For some implementations, a privacy request for personal information may be received and processed by the information privacy compliance server 256.

For some implementations, the information privacy compliance server 256 may be configured to verify privacy requests for personal information from authorized agents on behalf of people relative to an entity. The people may be customers of the entity or they may not be customers of the entity. For example, a person who is not a customer of an entity may have his or her personal information sold by a data broker. As another example, a person who is not a customer of an entity may be someone who has talked to a salesperson working for the entity, or someone whose personal information has been obtained by a company associated with the information privacy compliance server 256. One example of a company associated with the information privacy compliance server 256 is DataGrail, Inc. of San Francisco, California Operations may be performed to confirm the validity of the authorization.

Figure 3A:
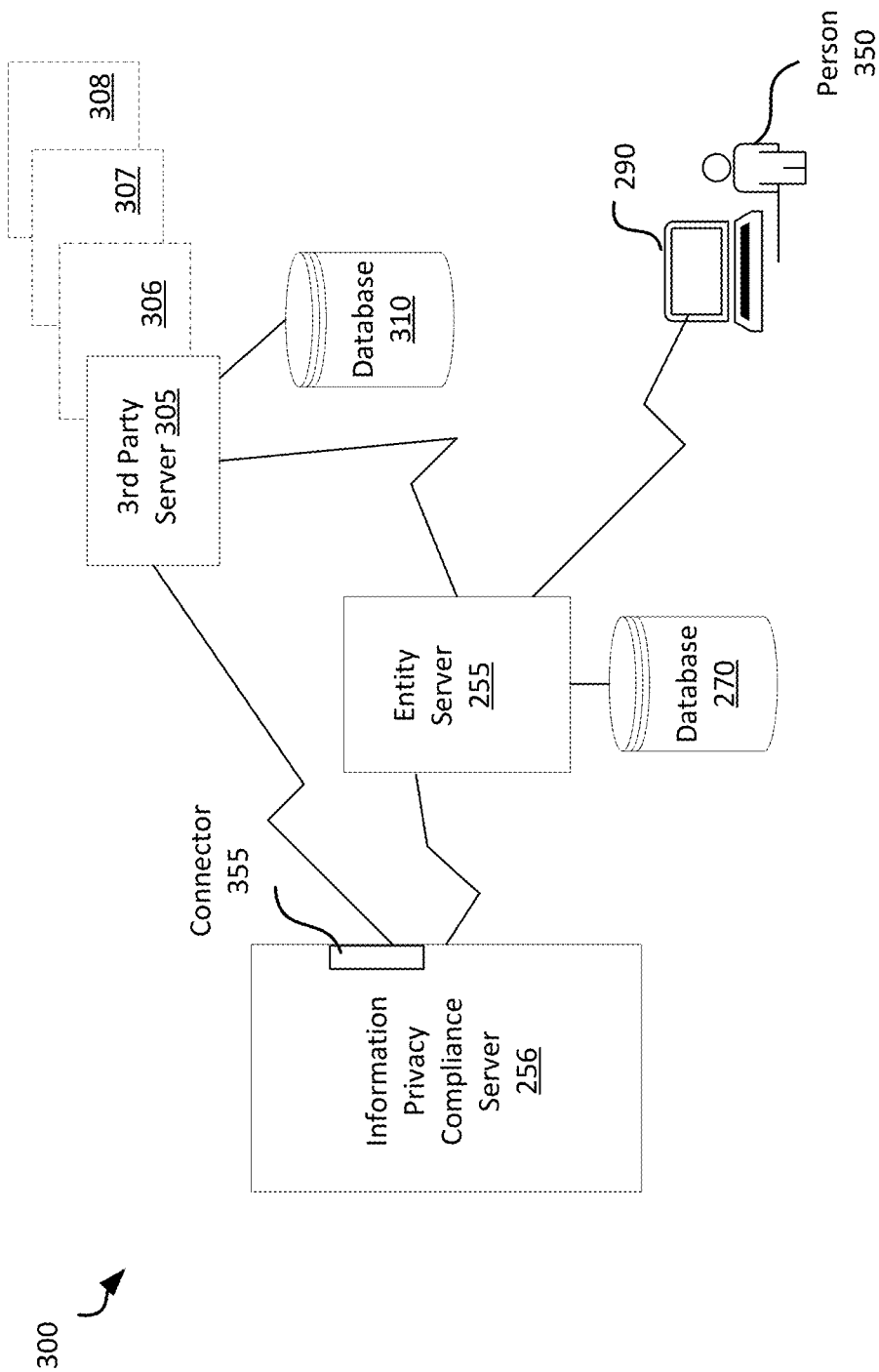
FIG. 3A shows an example diagram that includes a span of databases or systems where personal information of people may be stored, in accordance with some implementations.

FIG. 3A shows an example diagram that includes a span of databases or systems where personal information of people may be stored, in accordance with some implementations. Diagram 300 includes an information privacy compliance server 256, an entity server 255 associated with an entity (or a company), a third-party server 305 associated with the entity, and a person 350. The person 350 may or may not be a customer of the entity. The person 350 may submit a privacy request or may have another person or a company submitting the privacy request on behalf of the person 350.

For some implementations, the entity server 255 may be associated with one or more third-party servers configured to perform services on behalf of the entity. For example, besides being associated with the third-party server 305, the entity server 255 may also be directly or indirectly associated with the third party-servers 306, 307 and 308. For example, the entity server 255 may be associated with the third-party server 305, and the third-party server 305 may be associated with the third-party server 306. One or more connectors 355 may be used to connect to a third-party server.

The entity server 255 may communicate with, send data to or receive data from one or more of the third-party servers 305, 306, 307 and 308. It's possible that a third-party server is associated with a service provider. For example, the entity may be an online furniture business, and it may be associated with an email marketing service to perform marketing campaign on its behalf. In this example, the furniture business may be associated with the entity server 255, and the email marketing service may be associated with the third-party server 305. The email marketing service may send marketing emails on behalf of the furniture business using a list of contacts provided by the furniture business. The list of contacts may be stored in a database (e.g., database 270) associated with the furniture business. The list of contacts may be considered as one set of personal information.

When the person 350 interacts with an email from the email campaign, the email marketing service may collect personal information about the person 350 including, for example, the device (e.g., IP address, OS information, browser information, etc.) used by the person 350 and the interaction (e.g., browsing activities, etc.) by the person 350. Cookies and tracking technologies may be used, and the collected information about the person 350 may be stored by the email marketing service in the database 310 on behalf of the furniture business. The information collected by the email marketing service may be considered another set of personal information attributed to the furniture business. As such, the personal information collected and stored on behalf of the furniture business may be stored in the database 270 and in the database 310.

It may be possible that the email marketing service in this example may store some contact information in its own database, and it may be associated with a third-party customer relationship management (CRM) system where the contact information may be communicated to the CRM system. As a result, it may be possible that personal information associated with the customers of an entity may be stored across multiple databases or database systems, and data discovery operations may need to be performed to identify where the information is stored so that an accurate access report may be provided. For some implementations, the content of the access report may vary depending on the applicable law or regulation. For example, according to the CCPA, the access report may only need to include personal information collected by the entity. However, according to the GDPR, the access report may need to include all personal information in possession of the entity. For some implementations, when there is a change to the definition of personal information or personal data by the governing agency, the access report may be updated accordingly.

Privacy requests may be submitted by anyone (e.g., customers, prospects, people whose data has been sold) to request for the personal information that the entity may have access to. For example, the website of the furniture business may be hosted by another third-party service, and content of shopping carts of its customers may be stored in a database of this other third-party service. The third-party service may be implemented based on a software as a service (SaaS) platform where the applications and files associated with the website of the furniture business may be stored on the third-party server and associated database.

Figure 3B:
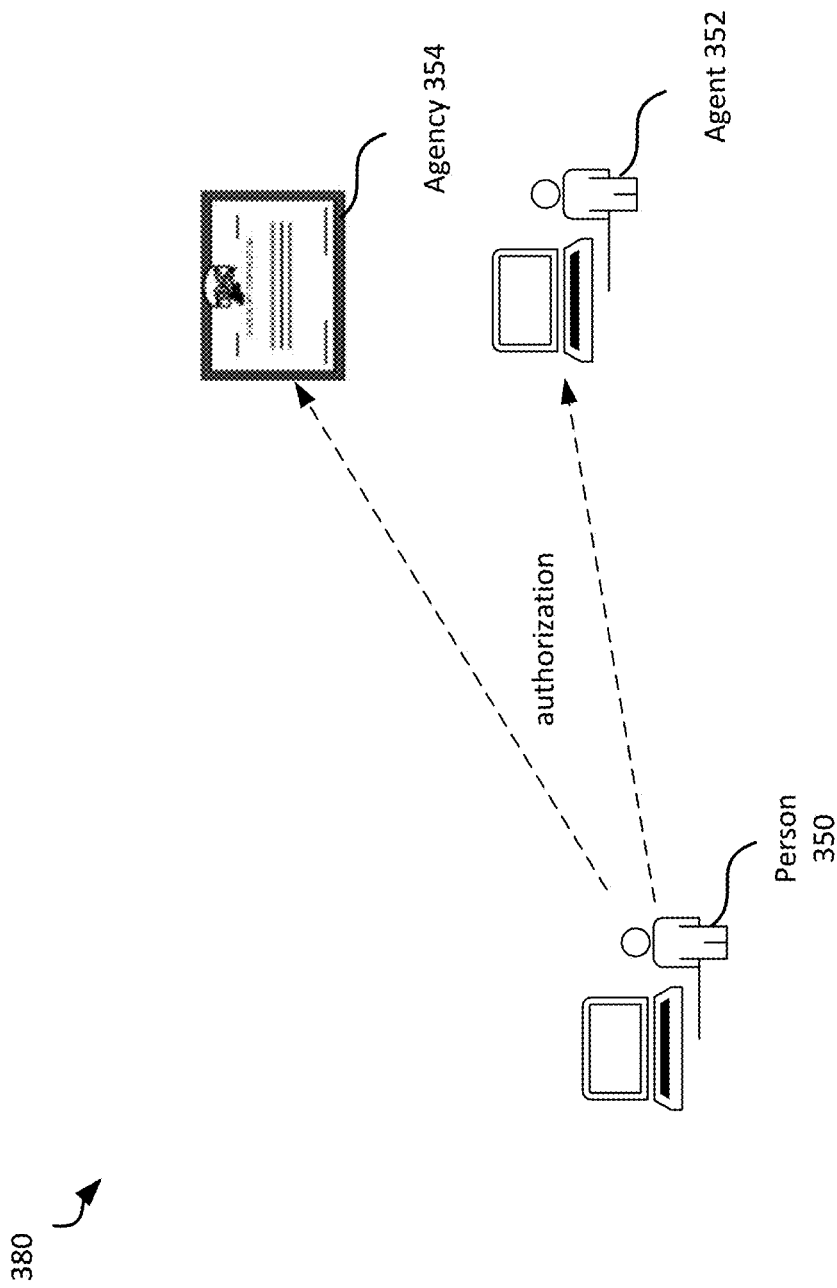
FIG. 3B shows an example diagram that includes an authorization by a person to an agent or an agency acting on the person's behalf as related to privacy rights, in accordance with some implementations.

FIG. 3B shows an example diagram that includes an authorization by a person to an agent or an agency acting on the person's behalf as related to privacy rights, in accordance with some implementations. It may be possible for a person (or a consumer) to authorize an agent or an agency to act on the person's behalf as related to consumer privacy rights. As shown in diagram 380, the person 350 may authorize either the agent 352 or agency 354 to represent the person 350. Some requirements may need to be satisfied for an authorization to be valid. For some implementations, the requirements may include a requirement that the authorization be witnessed. For some implementations, the requirements may include a requirement that the business entity be a registered business entity. For some implementations, the requirements may include a requirement that contact information of both the person or consumer and the agent be included in the authorization document. This may include requiring the authorization document to include an electronic signature of the person 350. For some implementations, the information privacy compliance server 256 may be configured to accept an agent of a person as related to the consumer privacy rights when the agent is authorized by the person via a general power of attorney.

Figure 4A:
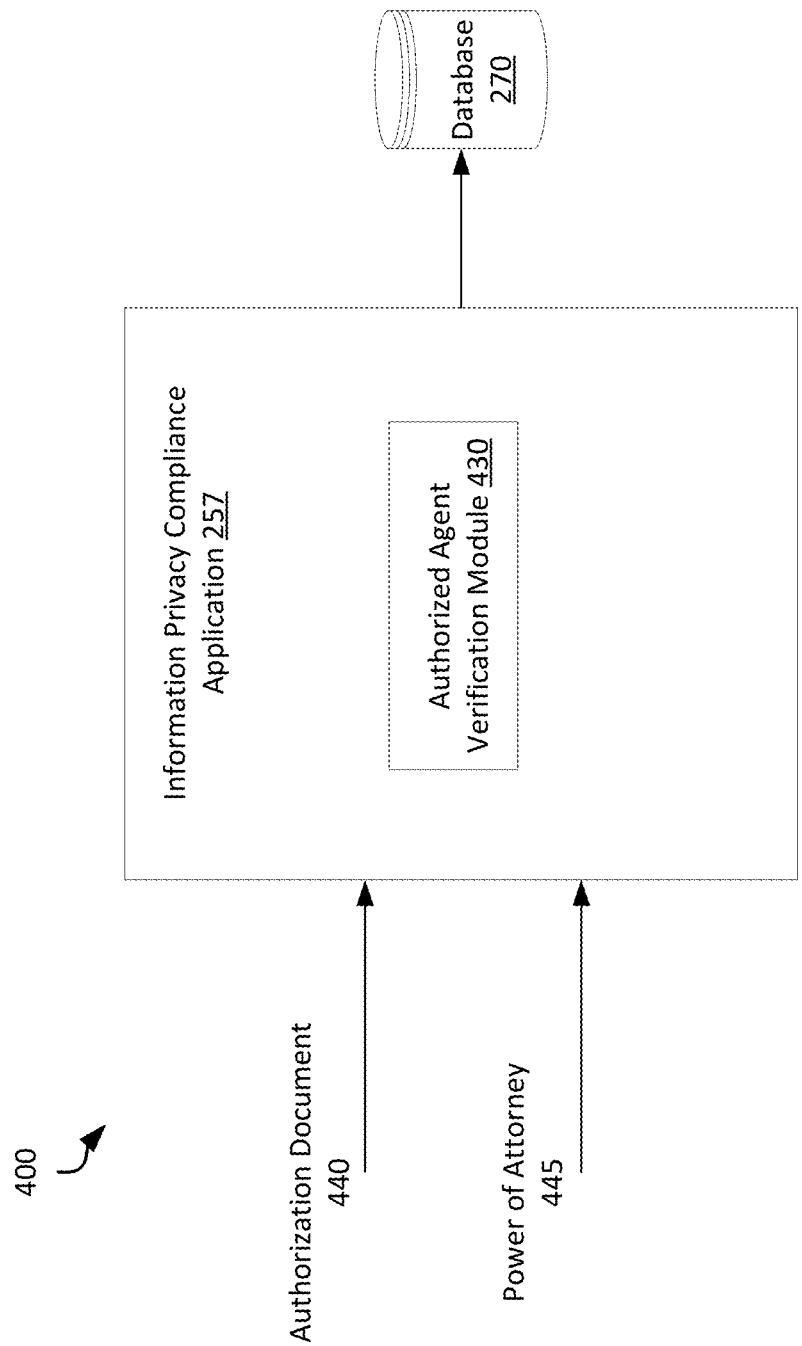
FIG. 4A shows an example diagram of an information privacy compliance application and an authorization by a person to an agent or an agency acting on a person's behalf as related to privacy rights, in accordance with some implementations.

FIG. 4A shows an example diagram of an information privacy compliance application with the authorization information, in accordance with some implementations. For some implementations, the information privacy compliance server 256 may be configured to verify an authorization document received from the agent 352 or agency 354 (shown in FIG. 3B) to confirm that the authorization document satisfies all the requirements as set forth by the applicable governmental regulation before accepting the agent 352 or agency 354 as an agent of a person 350. For some implementations, the verification of the authorization document may not be performed entirely by the information privacy compliance server 256. For example, in some situations, the verification may require human involvement.

As shown in diagram 400, an authorized agent verification module 430 may be configured to verify an authorization document 440 as related to consumer privacy rights and a power of attorney doument 445. For example, the authorized agent verification module 430 may be configured to determine whether the authorization document 440 includes a digital signature of a witness and a digital signature of a consumer granting the authorization. As another example, the authorized agent verification module 430 may be configured to determine whether the authorization document 440 includes the contact information of the person 350 who grants the authorization and the contact information of the agent 352 or agency 354 who receives the authorization.

It may be noted that the operations of the authorized agent verification module 430 may also be used to prevent fraudulent privacy requests by someone or some entity who is not authorized by the person 350. For some implementation, the information privacy compliance server 256 may be configured to verify with a governmental agency to determine whether the agent 352 or agency 354 exists.

Figure 4B:
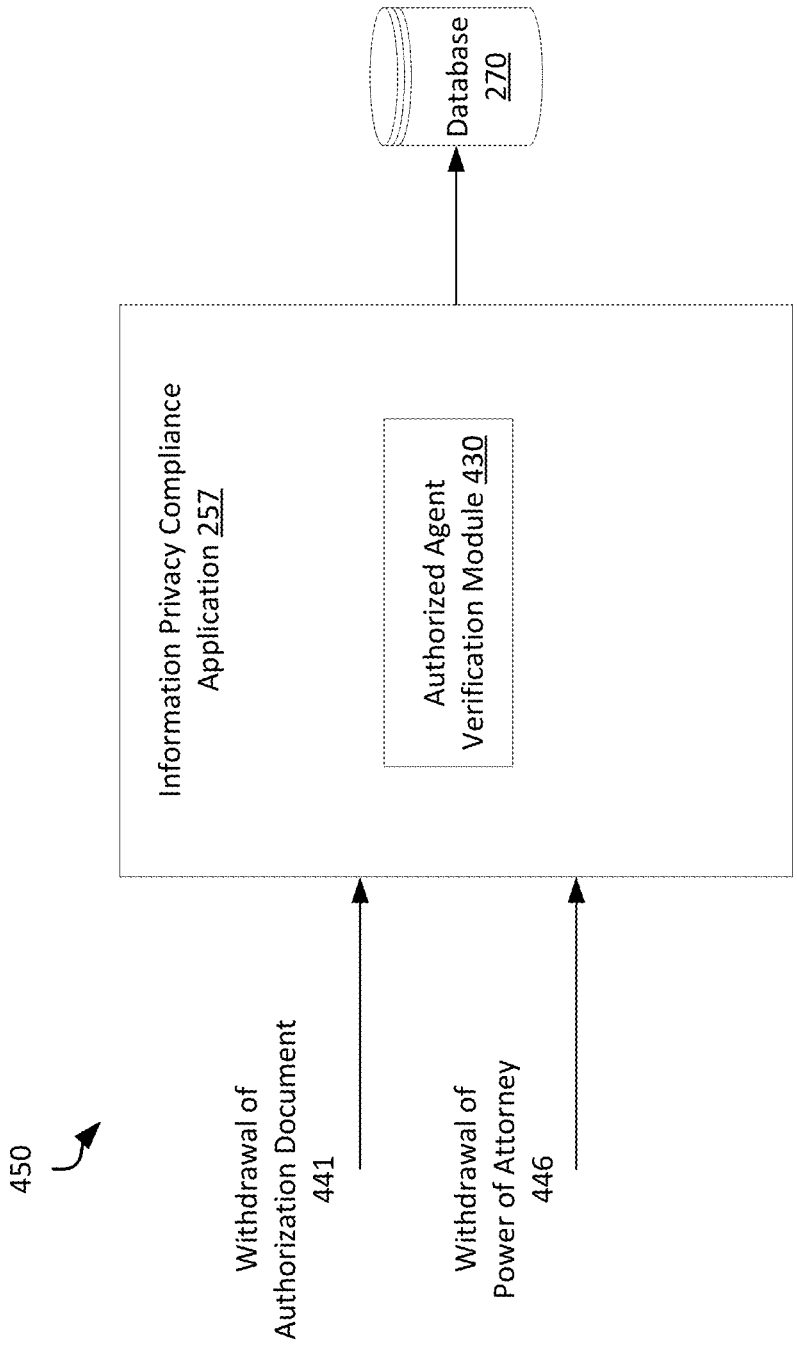
FIG. 4B shows an example diagram of an information privacy compliance application and an authorization withdrawal by a person, in accordance with some implementations.

FIG. 4B shows an example diagram of an information privacy compliance application with the authorization withdrawal information, in accordance with some implementations. It may be possible that an agent 352 who submits a privacy request on behalf of the person 350 may submit related requests on behalf of the same person 350 at a subsequent time. For example, a privacy request may be followed by another privacy request a few months later. As another example, a privacy request may be followed by a deletion request, an update request, and opt-out request, or a do-not-sell request. For some implementations, the authorized agent verification module 430 may be configured to store a valid authorization document for subsequent use. For example, when an agent 352 submits an update request subsequent to an initial privacy request, the authorized agent verification module 430 may only need to verify the information about the agent 352 and the person 350 that the agent 352 is acting on behalf of and comparing that information with the information included in the stored authorization document.

Like the concept of general power of attorney and limited power of attorney, for some implementations, the authorization may be a general authorization or a limited authorization. For example, a general authorization may enable an agent to act on a person's behalf to submit a privacy request, a deletion request, an update request, and opt-out request, or a do-not-sell request, while a limited authorization may enable the agent to submit only certain type of request. For some implementations, the operations performed by the privacy compliance server 256 with respect to the privacy request (also referred to as an access request), the deletion request, the update request, and the opt-out request or do-not-sell request may be controlled by the applicable privacy law (e.g., CCPA, GPDR, etc.). It may be noted that the operations performed by the privacy compliance server 256 as related to a privacy request may include operations to verify the identity of the person associated with the privacy request.

It may be possible for a stored authorization to be updated to expand the scope of authorization or to reduce the scope of authorization. For some implementations, the authorized agent verification module 430 may be configured to receive an authorization update document from a person or a consumer and update its stored authorization accordingly.

It may also be possible that a valid authorization document may be withdrawn at a subsequent time by the person or consumer. For some implementations, the authorized agent verification module 430 may be configured to compare an authorization withdrawal request with a stored authorization to verify that a person or a consumer associated with the authorization withdrawal request is the same as the person or consumer associated with the stored authorization. For example, this comparison may be performed by comparing the digital signatures on both documents to validate the authorization withdrawal request. When the comparison indicates that the authorization withdrawal request is valid, the stored authorization may be removed. When a stored authorization is removed, a privacy request submitted by an agent associated with the removed authorization at a subsequent time may be rejected.

Figure 4C:
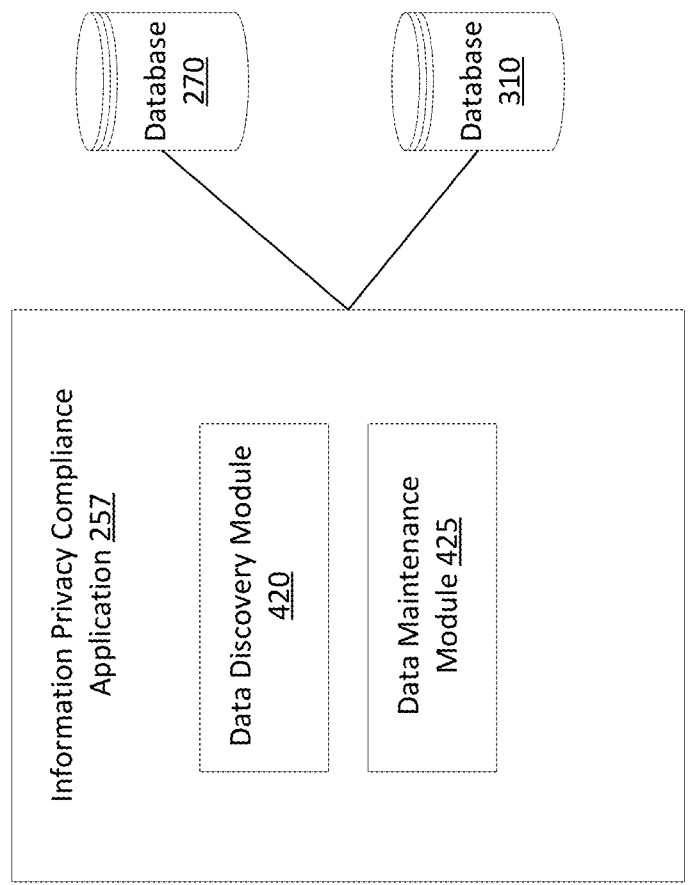
FIG. 4C shows an example diagram of an information privacy compliance application with its data discovery and maintenance functions, in accordance with some implementations.

FIG. 4C shows an example diagram of an information privacy compliance application with its data discovery and maintenance functions, in accordance with some implementations. In diagram 480, the information privacy compliance application 257 may be configured to include data discovery module 420, data maintenance module 425 and authorized agent verification module 430.

For some implementations, the data discovery module 420 may be configured to determine where the entity stores the personal information that it collects from its customers. It may be noted that the entity may store the information it collects from its customers in more than one location. This may include the personal information that is collected and stored on behalf of the entity by one or more third-party services. The data discovery module 420 may be configured to communicate with the entity server 255 and the third-party server 305.

For some implementations, the data maintenance module 425 may be configured to maintain the personal information discovered by the data discovery module 420 so that the personal information may be continuously refreshed. For example, a customer may submit a request to correct the personal information that the entity may currently have about the customer. The information submitted by the customer may then be received and processed by the data maintenance module 425.

For some implementations, the authorized agent verification module 430 may be configured to confirm the identity of a customer associated with an authorization. For example, the authorized agent verification module 430 may communicate with a computing system (e.g., a smart phone) associated with the person 350 to confirm that the person 350 authorizes someone who claims to be an agent of the person 350.

For some implementations, the authorized agent verification module 430 may be configured to confirm the identity of an agent associated with an authorization. For example, when the authorized agent verification module 430 receives an authorization presented by a computing system associated with someone who claims to be an agent of a person 350, the authorized agent verification module 430 may review the authorization and determine whether the person who claims to be the agent is the same as the person specified in the authorization.

For some implementations, the authorized agent verification module 430 may be configured to review the format of the authorization to determine whether the authorization meets all the requirements to be a valid authorization. The requirements for an authorization to be valid may vary depending on the applicable government regulation applicable to the entity and the person 350. For example, one governmental regulation about authorized agency may require that the authorization form be notarized, while another governmental regulation may require that the authorization uses a specific authorization form. For some implementations, the authorized agent verification module 430 may be configured to accept a general power of attorney as a valid form for authorized agency as related to submitting a privacy request on behalf of the person giving the general power of attorney.

Figure 5:
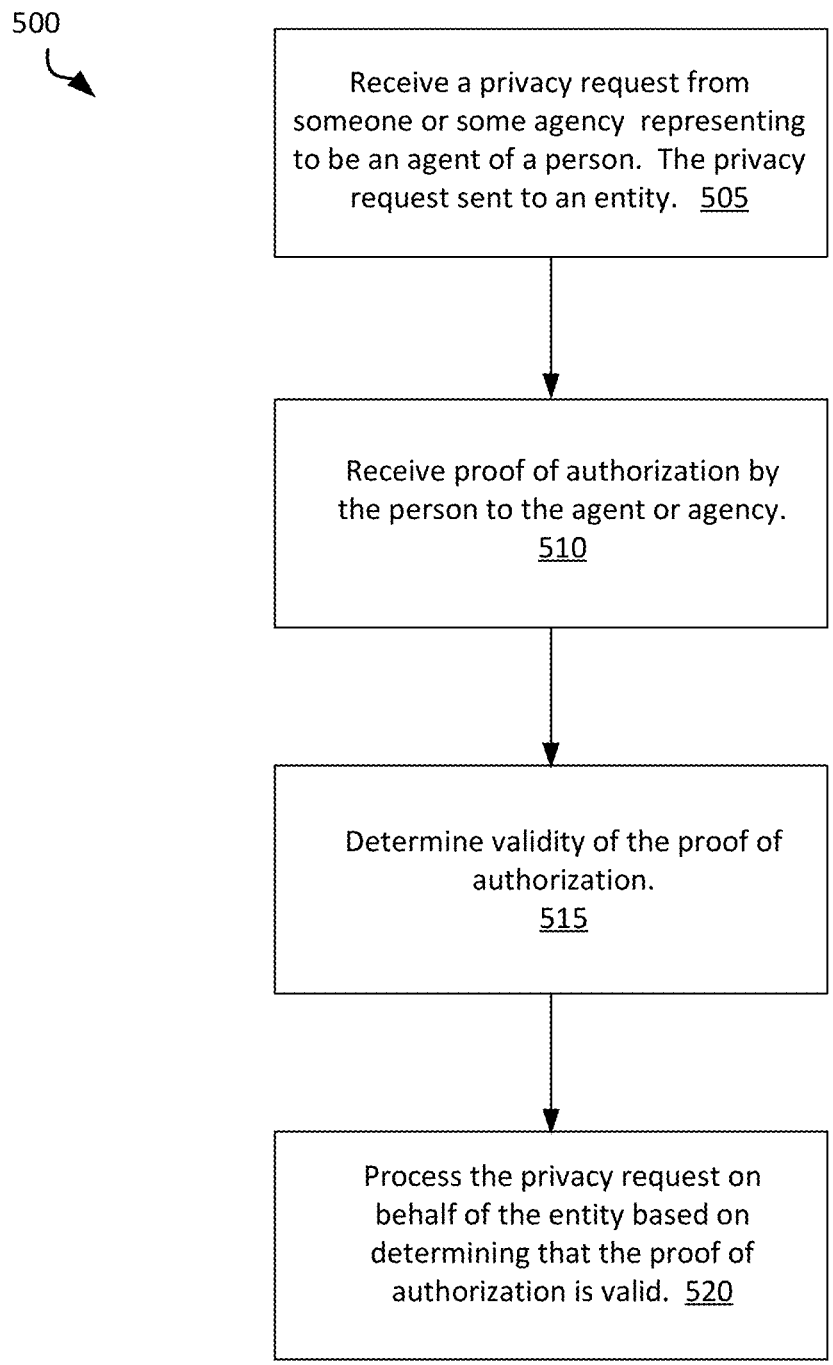
FIG. 5 is an example flow diagram of a process that may be used to process a privacy request submitted by an agent or an agency acting on a person's behalf, in accordance with some implementations.

FIG. 5 is an example flow diagram of a process that may be used to process a privacy request submitted by an agent, in accordance with some implementations. Diagram 500 may include operations performed by an information privacy compliance server 256 and the authorized agent verification module 430 (shown in FIG. 4A). At block 505, a privacy request may be received from a person, someone on behalf of the person, or a company of behalf of the person. When the privacy request is submitted by someone or a company on behalf of the person, the request may be referred to as a request submitted by an authorized agent of the person, and an authorization may be submitted along with the request. The authorized agent verification module 430 may be configured to perform operations on behalf of the entity. At block 510, a proof of authorization may be received. For example, the proof of authorization may be generated by the person 350 and provided to the agent 352. The proof of authorization may be received together with the privacy request, or it may be received in a different transmission. The authorized agent verification module 430 may be configured to reject the privacy request by the agent 352 when no proof of authorization is received. At block 515, the authorized agent verification module 430 may be configured to perform operations to validate the proof of authorization (also referred to as an authorization document). At block 520, based on successfully validating the proof of authorization, the privacy request may be processed. The privacy request may be processed by the information privacy compliance server 256 on behalf of the entity.

It may be noted even though the person mentioned in the process described in FIG. 5 may be the person that initiates or generates the proof of authorization, the person may or may not have engaged in any previous transactions with the entity.

Figure 6:
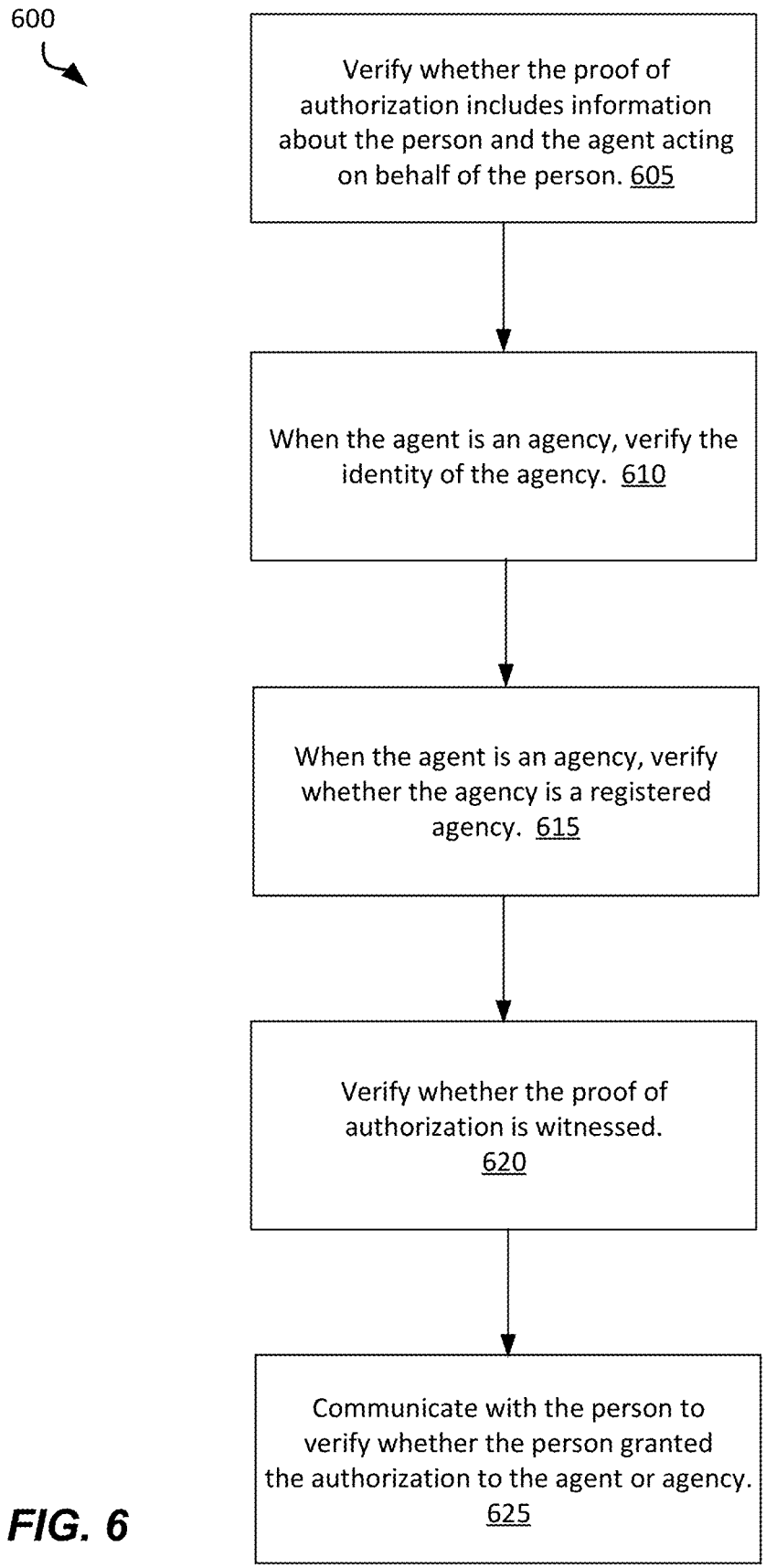
FIG. 6 is an example flow diagram of a process that may be used to validate an authorization submitted by an agent an agent or an agency acting on a person's behalf, in accordance with some implementations.

FIG. 6 is an example flow diagram of a process that may be used to validate a proof of authorization submitted by an agent, in accordance with some implementations. The validation may be performed by the authorized agent verification module 430 (shown in FIG. 4A). The process may be performed after receiving a proof of authorization from someone or from a business who claims to be an agent of a consumer.

At block 605, verification may be performed to determine whether the proof of authorization includes information about the person 350 and the agent 352 acting as the agent for the person 350. When a local regulation requires that a proof of authorization include information about a person 350 and information about an agent 352 as related to an authorization with the consumer privacy rights, the proof of authorization may be considered invalid when there is insufficient information about the person 350 and the agent 352.

At block 610, when the agent is an agency, operations may be performed to verify the identity of the agency. This may include verifying whether the agency 354 representing itself as the agent of the consumer is the same as the agency identified in the authorization document. Similar operations may be applied to verify whether the agent 352 representing as the agent of the person 350 is the same as the agent identified in the authorization document. Communication with a computer system associated with the agent and a computer system associated with a person may be performed to verify the identities. When the communication fails to verify the identities, the proof of authorization may be considered invalid.

At block 615, when the agent is an agency, operations may be performed to determine whether the agency is a registered agency. For example, a registered agency may be a company registered as a corporation with a state department of corporation. When a local regulation requires that an agency is a registered agency as related to authorization with the consumer privacy rights, the proof of authorization may be considered invalid when the agency is not registered.

At block 620, when a governmental regulation related to authorization for consumer privacy rights requires a proof of authorization to be witnessed, operations may be performed to determine whether the proof of authorization provided by an agent includes an electronic signature of a witness. The witness may be a notary public official. When a digital signature of a witness is missing in the proof of authorization, the proof of authorization may be considered invalid.

At block 625, operations may be performed to verify with the consumer that the consumer grants the authorization to the agent. This may be performed by communicating with a computer system associated with the consumer and receiving an electronic confirmation from the consumer confirming the authorization. When no confirmation or a negative confirmation is received from the consumer, the proof of authorization may be considered invalid. It may be noted that not all of the operations described in FIG. 6 may need to be performed to validate the proof of authorization. For example, some governmental regulations may not require that a proof of authorization to be witnessed or a business entity to be a registered business entity.

It may be noted the enforcement of requirements for an authorization to be considered valid may be decided by the entity. For example, the entity may decide as its policy that no notary (as described in block 620) is required for a proof of authorization to be considered valid.

Figure 7:
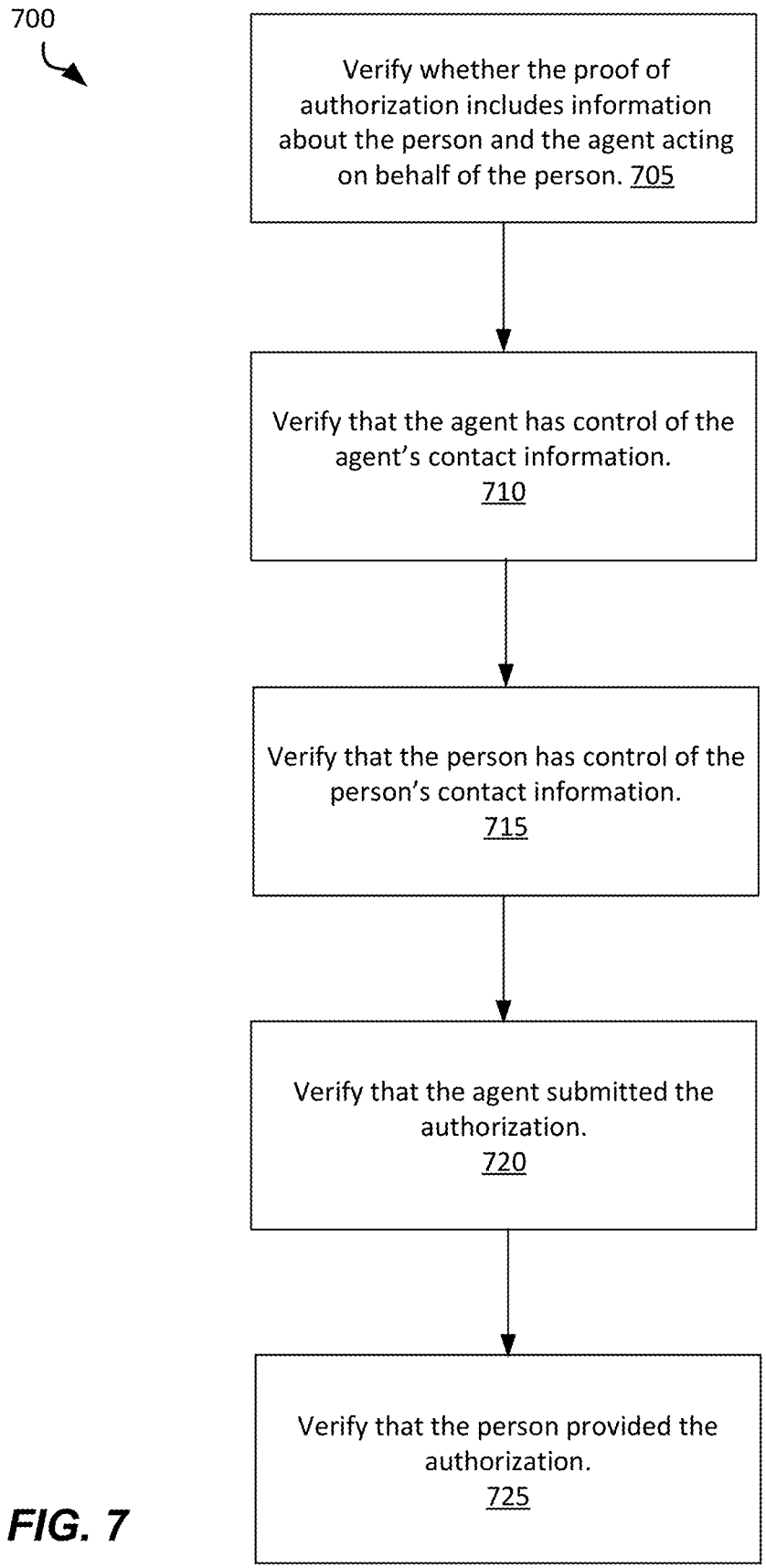
FIG. 7 is an example flow diagram of a process that verify the identity of an agent and validity of an authorization, in accordance with some implementations.

FIG. 7 is an example flow diagram of a process that verify the identity of an agent and validity of an authorization, in accordance with some implementations. The verification of the identity of the agent and the validity of an authorization may be performed by the authorized agent verification module 430 (shown in FIG. 4A). The process may be performed after receiving the privacy request and a proof of authorization from an agent.

At block 705, verification may be performed to determine whether the proof of authorization includes information about a person or consumer and an agent acting on behalf of the person or consumer. The proof of authorization may be considered invalid when there is insufficient information about the person or consumer and the agent.

At block 710, operations may be performed to verify that the agent has control of the agent's email inbox using the agent's email address that may be included in the privacy request. For example, this may include sending an email to the agent's email inbox. When the verification of the agent is successful, the flow may continue to block 715.

At block 715, operations may be performed to verify that the person or consumer has control of his or her inbox using the person's or consumer's email address that may be included in the privacy request. For example, this may include sending an email to the person's or consumer's inbox. When the verification of the person or consumer is successful, the flow may continue to block 720.

At block 720, the proof of authorization submitted by the agent may be verified using the agent's email inbox. For example, this may include sending a copy of the proof of authorization to the agent using the agent's email address.

At block 725, the proof of authorization submitted by the agent may be verified using the person's or consumer's email inbox. For example, this may include sending a copy of the proof of authorization to the person or consumer using the person's or consumer's email address.

It may be noted that even though the description of FIG. 7 refers to using an inbox or an email address, it may be possible to use other verification method such as, for example, using a phone number, address, etc. for some implementations.

For some implementations, a whitelist of known or assumed good agents or agencies may be maintained. For example, it's possible to have a privacy advocacy organization acting on behalf of many persons or consumers. For some implementations, the whitelist may be presented to an entity, and the entity may decide whether to accept that all privacy request submitted by such a privacy advocacy organization are presumed to be valid.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A computer-implemented method for processing privacy requests related to information privacy, the method implemented using a server computing system and comprising:

obtaining data related to a privacy request for personal information associated with a person, the data related to the privacy request sent to a computer system of a company from a computer system of an agent acting on behalf of the person as related to the information privacy, the data related to the privacy request including authorization data indicating that the person authorizes the agent to act on behalf of the person, the personal information stored in one or more databases associated with the server computing system;

confirming that the person authorizes the agent to act on behalf of the person as related to the information privacy, the confirming including determining validity of the authorization data and determining that an authorization document at least:
    satisfies an applicable government regulation regarding consumer information privacy rights, and
    identifies contact information of the person and contact information of the agent;

based on successfully determining the validity of the authorization data, associating the person with the authorization data;

verifying with a governmental organization at least that the agent exists;

based on successful confirmation that the person authorizes the agent and successful verification at least that the agent exists, processing the privacy request on behalf of the company;

updating an authorization stored in the one or more databases to at least expand or reduce a scope of the authorization based on an authorization update associated with the person;

searching the one or more databases using a first identifier included in the data related to the privacy request to identify a second identifier related to the first identifier, the first and second identifiers associated with the person;

verifying identity of the person using at least the second identifier; and based on successful verification of the identity of the person, generating a notification indicating that the data related to the privacy request is accepted.

2. The computer-implemented method of claim 1, wherein the authorization data is related to a proof that the person authorizes the agent to act on behalf of the person.

3. The computer-implemented method of claim 1, further comprising:

using the authorization data to process a subsequent privacy request associated with the agent acting on behalf of the person.

4. The computer-implemented method of claim 1, wherein determining the validity of the authorization data includes communicating with a computer system associated with the person to confirm that the person authorizes the agent.

5. The computer-implemented method of claim 1, wherein determining the validity of the authorization data includes:

determining identification information of the agent; and confirming that the identification information of the agent is consistent with identification information included in the authorization data.

6. The computer-implemented method of claim 1, further comprising:

storing the authorization data in the one or more databases.

7. The computer-implemented method of claim 1, further comprising:

searching the one or more databases for the personal information based on one or more of the first identifier or the second identifier.

8. A system for processing privacy requests related to information privacy, the system comprising:

one or more processors; and a non-transitory computer readable medium storing a plurality of instructions, which when executed, cause the one or more processors of a server computing system to:

obtain data related to a privacy request for personal information associated with a person, the data related to the privacy request sent to a computer system of a company from a computer system of an agent acting on behalf of the person as related to the information privacy, the data related to the privacy request including authorization data indicating that the person authorizes the agent to act on behalf of the person, the personal information stored in one or more databases associated with the server computing system;

confirm that the person authorizes the agent to act on behalf of the person as related to the information privacy, the confirming including determining validity of the authorization data and determining that an authorization document at least:

satisfies an applicable government regulation regarding consumer information privacy rights, and identifies contact information of the person and contact information of the agent;

based on successfully determining the validity of the authorization data, associate the person with the authorization data;

verify with a governmental organization at least that the agent exists;

based on successful confirmation that the person authorizes the agent and successful verification at least that the agent exists, process the privacy request on behalf of the company;

update an authorization stored in the one or more databases to at least expand or reduce a scope of the authorization based on an authorization update associated with the person;

search the one or more databases using a first identifier included in the data related to the privacy request to identify a second identifier related to the first identifier, the first and second identifiers associated with the person;

verify identity of the person using at least the second identifier; and based on successful verification of the identity of the person, generate a notification indicating that the data related to the privacy request is accepted.

9. The system of claim 8, wherein the authorization data is related to a proof that the person authorizes the agent to act on behalf of the person.

10. The system of claim 8, wherein the instructions when executed further cause the one or more processors to:

use the authorization data to process a subsequent privacy request associated with the agent acting on behalf of the person.

11. The system of claim 8, wherein determining the validity of the authorization data includes communicating with a computer system associated with the person to confirm that the person authorizes the agent.

12. The system of claim 8, wherein determining the validity of the authorization data includes:

determining identification information of the agent; and confirming that the identification information of the agent is consistent with identification information included in the authorization data.

13. The system of claim 8, wherein the instructions when executed further cause the one or more processors to:

store the authorization data in the one or more databases.

14. The system of claim 8, wherein the instructions when executed further cause the one or more processors to:

search the one or more databases for the personal information based on one or more of the first identifier or the second identifier.

15. A computer program product comprising non-transitory computer-readable storage medium storing computer-readable program code to be executed by one or more processors, the program code including instructions to:

obtain data related to a privacy request for personal information associated with a person, the data related to the privacy request sent to a computer system of a company from a computer system of an agent acting on behalf of the person as related to information privacy, the data related to the privacy request including authorization data indicating that the person authorizes the agent to act on behalf of the person, the personal information stored in one or more databases;

confirm that the person authorizes the agent to act on behalf of the person as related to the information privacy, the confirming including determining validity of the authorization data and determining that an authorization document at least:

satisfies an applicable government regulation regarding consumer information privacy rights, and identifies contact information of the person and contact information of the agent;

based on successfully determining the validity of the authorization data, associate the person with the authorization data;

verify with a governmental organization at least that the agent exists;

based on successful confirmation that the person authorizes the agent and successful verification at least that the agent exists, process the privacy request on behalf of the company;

update an authorization stored in the one or more databases to at least expand or reduce a scope of the authorization based on an authorization update associated with the person;

search the one or more databases using a first identifier included in the data related to the privacy request to identify a second identifier related to the first identifier, the first and second identifiers associated with the person;

verify identity of the person using at least the second identifier; and based on successful verification of the identity of the person, generate a notification indicating that the data related to the privacy request is accepted.

16. The computer program product of claim 15, wherein the authorization data is related to a proof that the person authorizes the agent to act on behalf of the person.

17. The computer program product of claim 15, wherein the program code further includes instructions to:

use the authorization data to process a subsequent privacy request associated with the agent acting on behalf of the person.

18. The computer program product of claim 15, wherein determining the validity of the authorization data includes communicating with a computer system associated with the person to confirm that the person authorizes the agent.

19. The computer program product of claim 15, wherein determining the validity of the authorization data includes:

determining identification information of the agent; and confirming that the identification information of the agent is consistent with identification information included in the authorization data.

20. The computer program product of claim 15, wherein the program code further comprising includes instructions to:

store the authorization data in the one or more databases.

\* \* \* \* \*